United States Patent
Huddleston et al.

[19]

[11] Patent Number: 5,855,084
[45] Date of Patent: Jan. 5, 1999

[54] FISHING POLE TIP ILLUMINATION ATTACHMENT

[76] Inventors: J. C. Huddleston, 52825 Highway 50 East; Jeffery D. Lenhart, 53051 Highway 50 East, both of Boone, Colo. 81025

[21] Appl. No.: 733,635

[22] Filed: Oct. 17, 1996

[51] Int. Cl.⁶ .................................................. A01K 87/04
[52] U.S. Cl. ........................ 43/17.5; 43/17; 43/24
[58] Field of Search ..................... 43/17, 17.5, 18.1, 43/24, 25, 25.2; D26/138; D22/139; 362/34, 158

[56] References Cited

U.S. PATENT DOCUMENTS

| | | | |
|---|---|---|---|
| D. 299,377 | 1/1989 | Garcia | D22/134 |
| D. 309,255 | 7/1990 | Karow, Jr. | D26/138 |
| D. 316,302 | 4/1991 | Douthitt | D26/46 |
| D. 321,763 | 11/1991 | Short | D22/139 |
| D. 325,240 | 4/1992 | Ellis | D22/139 |
| D. 359,817 | 6/1995 | Leveika | D26/138 |
| 963,654 | 7/1910 | Shindler | 43/17 |
| 2,620,586 | 12/1952 | Seifert | 43/25 |
| 2,650,447 | 9/1953 | Johnson | 43/24 |
| 2,652,654 | 9/1953 | Bahn | 43/24 |
| 2,770,907 | 11/1956 | Sharer | 43/25 |
| 3,017,499 | 1/1962 | Fore | 43/17.5 |
| 3,105,233 | 9/1963 | D'Amore et al. | 43/17.5 |
| 3,624,689 | 11/1971 | Rizzo | 43/17 |
| 3,740,887 | 6/1973 | Van Leeuwen | 43/17 |
| 3,882,629 | 5/1975 | Kaye | 43/25 |
| 4,117,618 | 10/1978 | Utsler | 43/17.5 |
| 4,118,882 | 10/1978 | Gorsky | 43/17 |
| 4,133,130 | 1/1979 | Young, Jr. | 43/17 |
| 4,479,321 | 10/1984 | Welstead | 43/17 |
| 4,505,063 | 3/1985 | Price et al. | 43/17 |
| 4,697,375 | 10/1987 | Mills | 43/17.5 |
| 4,707,892 | 11/1987 | Nelson | 43/25.2 |
| 4,823,496 | 4/1989 | Powell | 43/25 |
| 4,873,780 | 10/1989 | Lancette | 43/25.2 |
| 5,029,409 | 7/1991 | Nouwens | 43/25 |
| 5,159,774 | 11/1992 | Bennis et al. | 43/17.5 |
| 5,228,228 | 7/1993 | Meissner | 43/17 |
| 5,274,943 | 1/1994 | Ratcliffe et al. | 43/17 |
| 5,321,587 | 6/1994 | Fujita | 362/34 |
| 5,555,667 | 9/1996 | Bae et al. | 43/17 |

FOREIGN PATENT DOCUMENTS

| | | | |
|---|---|---|---|
| 2836769 | 3/1980 | Germany . | |
| 4053437 | 2/1992 | Japan | 43/17.5 |
| 1118237 | 6/1968 | United Kingdom . | |
| 2052231 | 1/1981 | United Kingdom . | |
| 2196222 | 4/1988 | United Kingdom | 43/25 |

*Primary Examiner*—Michael J. Carone
*Assistant Examiner*—Darren Ark
*Attorney, Agent, or Firm*—Ramon L. Pizarro; Edwin H. Crabtree

[57] ABSTRACT

A device for attaching a chemical illumination device to the tip area of a fishing rod. The device includes a hollow body with a first end, a mid portion, and a second end. The first end of the hollow body includes an aperture which has been adapted for receiving the tip of the fishing rod, and the second end of the hollow body includes an aperture which has been adapted for receiving the chemical illumination device. A line guide loop is attached near the second end of the hollow body, so that the tip of the fishing rod may serve as a line guide while holding the chemical illumination device.

6 Claims, 4 Drawing Sheets

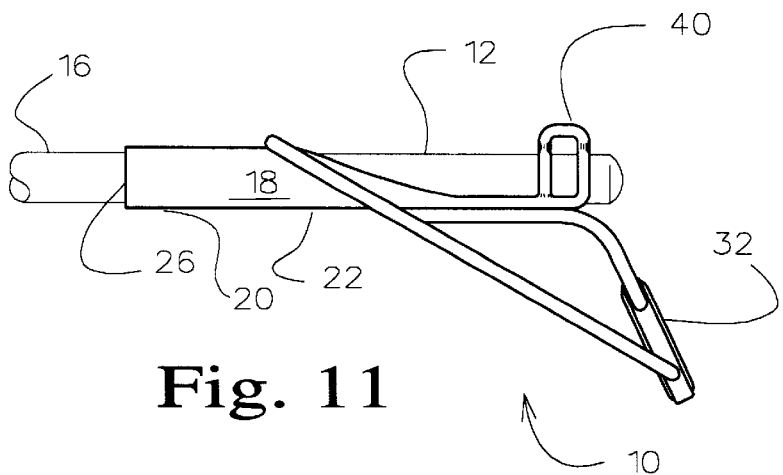
Fig. 11
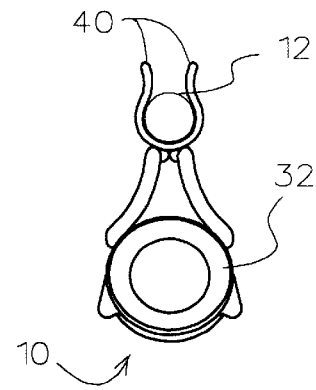
Fig. 12
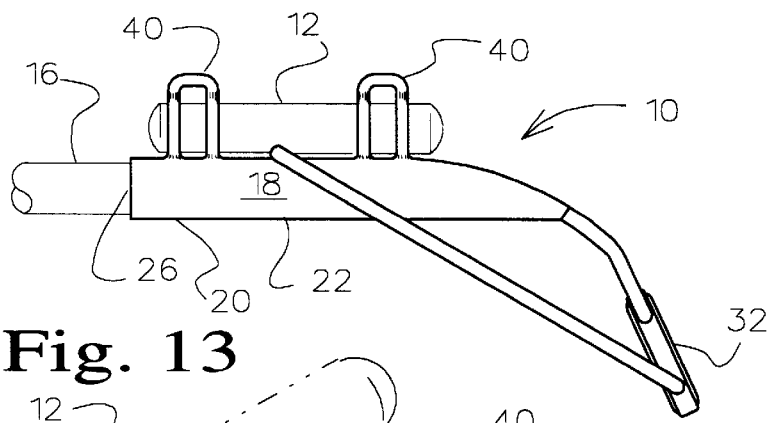
Fig. 13
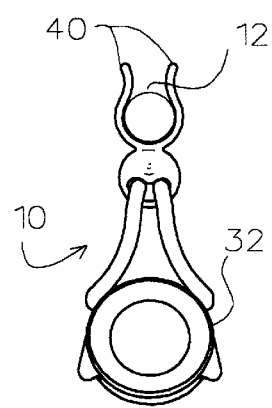
Fig. 14
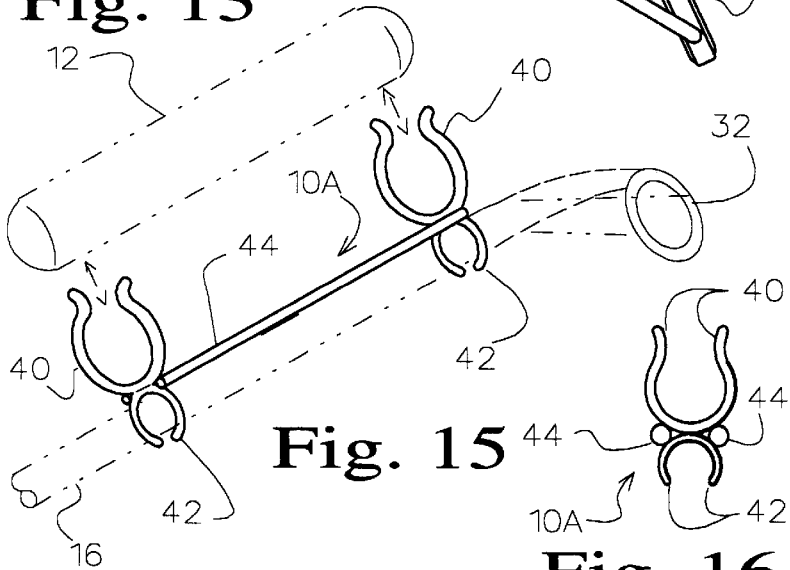
Fig. 15
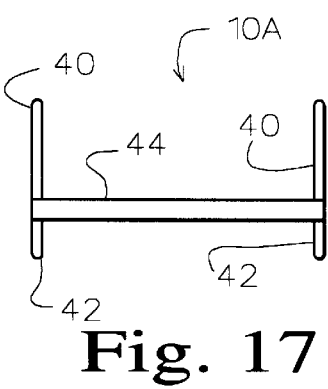
Fig. 16 Fig. 17

FISHING POLE TIP ILLUMINATION ATTACHMENT

BACKGROUND OF THE INVENTION (a) Field of the Invention

This invention generally relates to field of fishing rod mounted fishing equipment, and more particularly, but not by way of limitation, to an apparatus for attaching a chemical illumination device to the tip area of a fishing rod.

(b) Discussion of Prior Art

The advantages of night fishing have long been recognized since many species of fish feed well into the night or early in the morning before the sun rises. The absence of light during night fishing introduces problems which are not experienced during daylight fishing. Unfortunately, most popular fishing equipment is designed for fishing in daylight and does not address the problems encountered by people who fish at night.

One of the most significant problems has to do with the detection of a bite or a nibble on the bait. The problem arises due to the fact that most commercially available fishing poles do not include devices that facilitate the observation of the fishing rod tip at night. An examination of the known prior art reveals that there have been several attempts at solving the problems associated with detecting a bite or nibble while fishing at night. Most known approaches, however, are directed at attaching or incorporating some sort of battery powered light or light emitting diode (LED) at the tip of the pole. This approach was taken in U.S. Pat. Nos. Des. D316,302, D299,377, as well as in U.S. Pat. Nos. 4,697,375, 4,479,321, and 4,117,618. This approach was also taken in the inventions disclosed in British patents 2,052,231 to Pavey and 1,118,237 to Ilsen, and in German patent number 2,836,769 to Lorenz.

There are many problems associated with devices that rely on electrical devices for illumination of the fishing rod or rod tip. Perhaps the most glaring problem is that electrical devices are vulnerable to short circuiting in damp environments, such as the areas in which fishing poles are used. Also, these devices require the use of wiring and circuitry to operate the light bulb or LED. This wiring has to be incorporated into the body of the fishing rod, which results in a device that is seriously disadvantaged by the fact that these imbedded wires and components are nearly impossible to maintain without having to destroy the fishing rod.

Also, many of the known devices simply mount a battery powered light on to the tip area of the fishing rod. This approach solves many of the maintainability problems associated with fishing poles that incorporate wiring along the length of the rod, but greatly reduce the sensitivity of the fishing rod due to the mass of the lighting device attached to the tip of the fishing rod.

The problems associated with the sensitivity of the fishing pole are important since fish frequently simply take the bait and hold the bait in their mouths to feel or taste it before actually taking or swallowing the bait. To hook a fish that is simply mouthing the bait, the fisherman must become aware of the fact that the fish is mouthing the bait and then jerk the fishing rod to get the fishing hook to sink into the fish's mouth. If the fisherman jerks the fishing rod at the wrong instant, the jerking motion may cause the bait to fall off the hook or the sudden motion may frighten an indecisive fish that had been spying the bait. If the fisherman does not notice that a fish is playing with the bait, and he does not jerk the rod at all, then the fisherman gives the fish the opportunity to steal the bait without getting hooked.

Thus, the fisherman must pay close attention to the tip of the rod to determine whether a fish is mouthing or playing with the bait, so that he may jerk the rod at the most opportune instant. It is a difficult task to determine the right instant to jerk on the rod, however. This is due to the fact that the water being fished is likely to impart some motion to the fishing line and fishing rod tip, and the fisherman must be able to distinguish between the subtle motion imparted by the water and the subtle motion induced by a fish who is mouthing the bait.

Thus it can be appreciated that devices which attach bulky battery operated lighting devices on to the tip of the fishing rod are likely to severely impair the fisherman's ability to detect subtle nibbling or mouthing of the bait. This problem is not solved by devices which have motion actuated switches that cause the light to flicker whenever a fish begins to tug on the line. This is because many fish will impart such subtle motion on the line that this motion will be indistinguishable to the mechanical triggering mechanism from motion imparted by the wind or water. It takes the observation of the experienced fisherman to be able to distinguish the regular motion imparted by the water from the tugging motion imparted by the fish.

Thus there remains a need for a system for assisting the fisherman, who is fishing at night, in determining when a fish is nibbling or mouthing the bait. There remains a need for such a device which does not weigh the tip of the rod to the point of reducing the sensitivity of the rod and preventing the fisherman from observing the characteristic tugging motion imparted by a nibbling fish.

There remains a need for a device that can be used to allow night fishermen to observe the motion of the tip of their fishing rods, and which can be maintained without the need of wiring or batteries.

There remains a need lightweight illumination device attachment for the tip of a fishing pole so that the weight of the device does not dampen the motion of the tip of the fishing rod.

There remains a need for a low maintenance device for illuminating the tip of a fishing pole in a manner that is not susceptible to failure due to its immersion in water.

SUMMARY

It has been discovered that the above problems, which had been left unsolved by the known prior art, can be solved by providing a fishing rod tip which includes the following elements:

a) means for accepting the tip of the fishing rod; and b) means for removably accepting a chemical lighting device, the means for removably accepting a chemical lighting device being attached to the means for accepting tip of the fishing rod.

In a preferred embodiment of the invention the device includes:

a) a hollow body with: a first end, a mid portion, and a second end, the first end having an aperture adapted for receiving the tip of a fishing rod, and the second end having an aperture adapted for receiving the chemical illumination device; and b) a line guide loop attached near the second end of the hollow body, so that the tip of the fishing rod may serve as a line guide while holding the chemical illumination device.

In this preferred embodiment the aperture adapted for receiving the tip of the fishing rod and the aperture adapted for receiving the cylindrical chemical illumination device are substantially in line with one another, although it is contemplated that the aperture adapted for receiving the tip of the fishing rod and the aperture adapted for receiving the cylindrical chemical illumination device could simply be substantially parallel to one another.

According to another embodiment of the invention the aperture adapted for receiving the chemical illumination device is defined by at least one pair of resilient arms extending from the second end of the hollow body. The pair of resilient arms may preferably be adapted for receiving the chemical illumination device by being of a generally arched or bowed shape.

According to yet another aspect of the instant invention a method for illuminating the tip of a fishing rod has been discovered, the method includes the following steps:

a) providing a chemical illumination device;
b) providing an attachment clip having an aperture for accepting the tip of a fishing pole and having means for accepting a chemical illumination device;
c) inserting the tip of the fishing pole into the means for accepting the tip of a fishing pole; and
d) inserting the chemical illumination device into the means for accepting the means for accepting the chemical illumination device.

Therefore, with this summary it will become apparent that the disclosed invention solves the weight problems associated with illumination devices which use batteries as the power source for illuminating the tip or other portions of the fishing pole.

Further, it can be appreciated that the instant invention provides a very reliable device and system. It is preferred that the chemical illumination device be of the phosphorescent type which are typically sold as plastic cylinders with internal chemical reactants in separate internal compartments. To activate these illumination devices one typically bends the cylinders to break the internal compartments and allow the chemical reactants to mix and react to emit light. These devices are readily available in sizes of about one and one half inches long by 3/16 of an inch in diameter. These devices weigh very little and require no electrical circuitry for operation. Thus, the instant invention used for converting standard fishing poles to illuminated fishing poles either temporarily or permanently as where the entire tip and line guide is replaced or where the invention is included as original equipment.

Still further, it will be appreciated that the instant invention solves the problems associated with reliability, since the disclosed invention requires no moving parts, no electrical contacts, and very few components.

As will become clearly apparent form the drawings and accompanying disclosure, that due to its light weight and small size, the instant invention solves problems of sensitivity and responsiveness associated with the known prior art. More specifically, since the instant invention is light weight it will obviate problems with damping or inertia associated with more massive devices. Moreover, the instant invention will allow a user to modify an existing fishing pole for night fishing without having to carry out extensive modifications to the pole. Still further, since the instant invention does not impart the weight and other disadvantages of electrically illuminated fishing poles to a pole which has been modified with the instant invention, the invention allows the user to use the same pole during the day or night, and thus reducing the number of fishing poles that a fisherman needs to own.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 11 is a side view of an embodiment of the invention having a pair of resilient arms as clamping means for holding the chemical illumination device.

FIG. 12 is an end view of the embodiment of the invention illustrated in FIG. 11.

FIG. 13 is a side view of an embodiment of the invention having two sets of a pair of resilient arms as clamping means for holding the chemical illumination device.

FIG. 14 is an end view of the embodiment of the invention illustrated in FIG. 13.

FIG. 15 is a perspective view of an alternative embodiment containing of a device taking advantages of principles taught herein.

FIG. 16 is an end view of the embodiment shown on FIG. 15.

FIG. 17 is a side view of the embodiment shown on FIG. 16.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
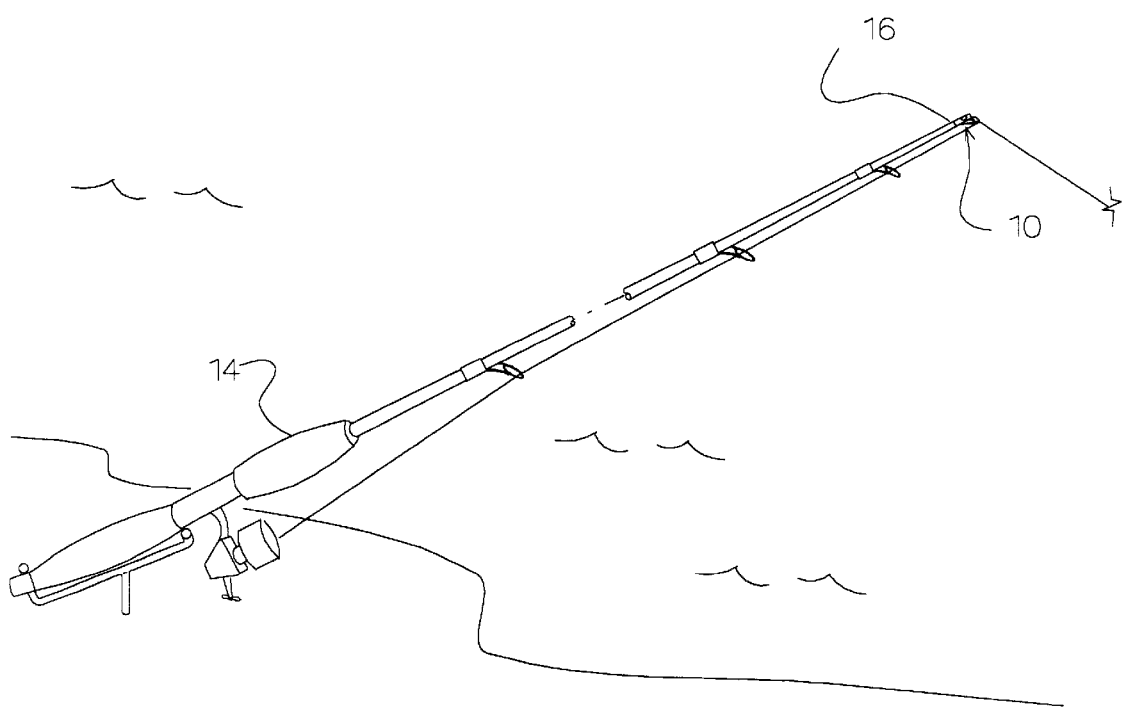
FIG. 1 is a perspective view of a fishing pole equipped with an embodiment of the instant invention.
Figure 2:
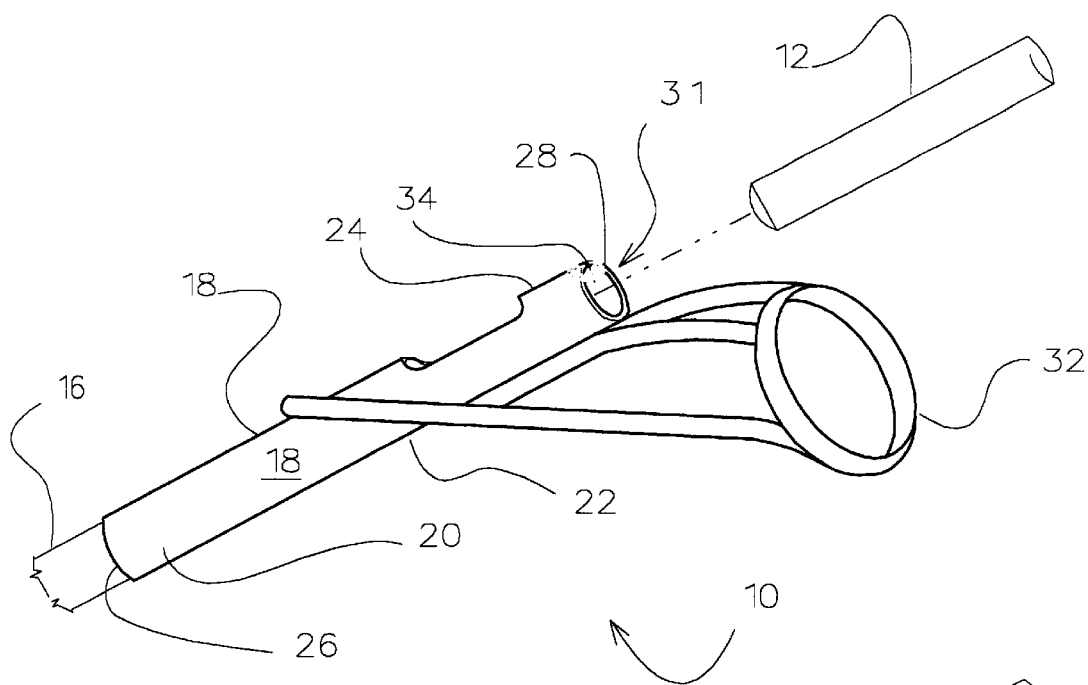
FIG. 2 is a perspective view of an embodiment of the invention.

Shown in FIGS. 1 and 2 is an attachment device 10 for attaching a chemical illumination device 12 to a fishing rod 14 having a tip 16. The attachment device 10 mounts on the tip 16 of the fishing rod 14 and can receive and hold the chemical illumination device 12 on the tip 16 of the fishing rod 14.

In FIG. 2 a highly preferred embodiment of the instant invention is shown installed on the tip 16 of a fishing rod. The illustration shows that the attachment device 10 includes a hollow body 18 with a first end 20, a mid portion 22, and a second end 24. The tip 16 of the fishing rod has been shown inserted into the first end 20 of the attachment device 10. The tip 16 of the fishing rod fits into an aperture 26 in the first end 20 of the attachment device 10. The aperture 26 has been adapted for receiving the tip 16 of the fishing rod, so that the attachment device may be used to modify an existing fishing rod or as original equipment on a new rod.

The second end 24 of the attachment device 10 includes an aperture 28, which has been adapted for receiving the chemical illumination device 12, and thus serves as a clamping means 31 for holding the chemical illumination device 12 within the second end 24. It is contemplated that the gripping function of the clamping means 31 can be carried out by providing a simple interference fit between the aperture 28 and the chemical illumination device, or by providing some sort of protrusion on the inner surface 34 of the second end 24 to provide frictional force against the chemical illumination device 12.

The chemical illumination device 12 is preferably of the type commonly known as chemiluminescent lighting devices or light sticks. These devices typically include at least two sealed compartments. Each compartment containing one of two chemical components, which when mixed react to produce chemical light. Devices of this type are shown in U.S. Pat. Nos. 3,576,987, 4,508,642, or 4,193,109.

Figure 3:
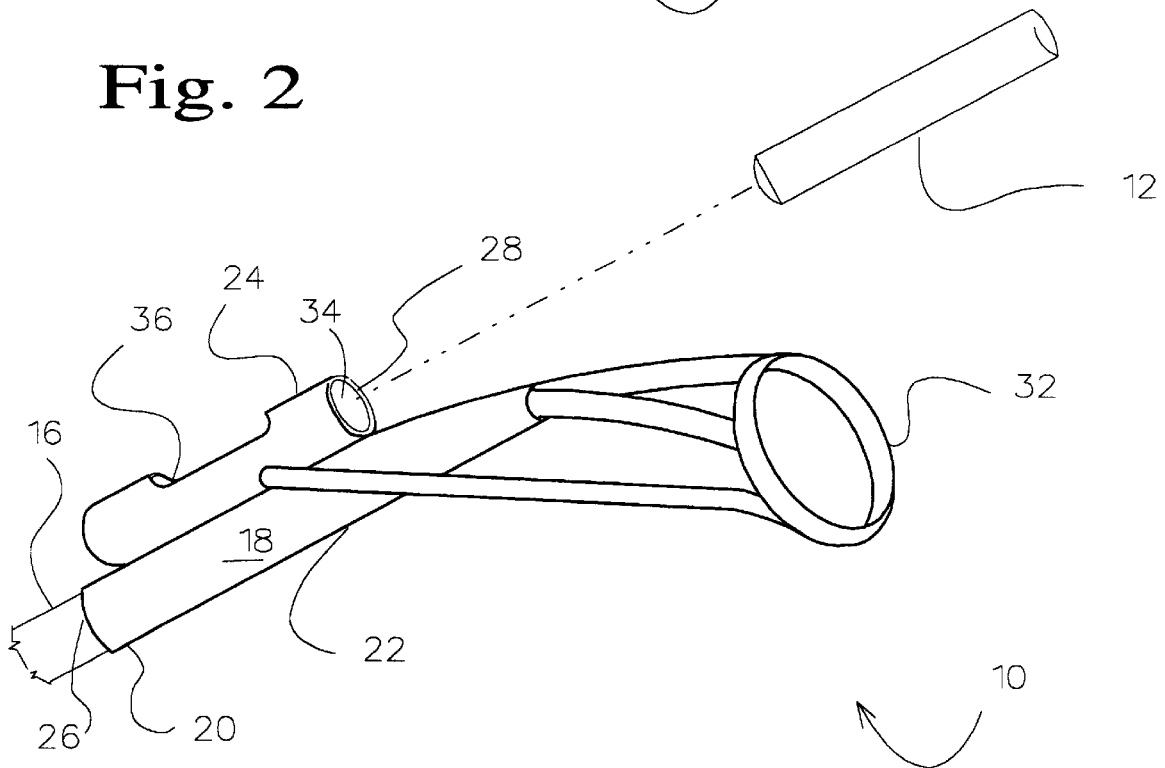
FIG. 3 is a perspective view of an embodiment of the invention.

As shown on FIGS. 2 and 3, a highly preferred embodiment of the attachment device 10 includes a line guide 32, which may simply be a loop, attached near the second end 24 of the hollow body 18. Thus, by incorporating a line guide 32 on to the device 10, the tip of the fishing rod may serve both as a line guide and a support for the chemical illumination device 12.

Figure 4:
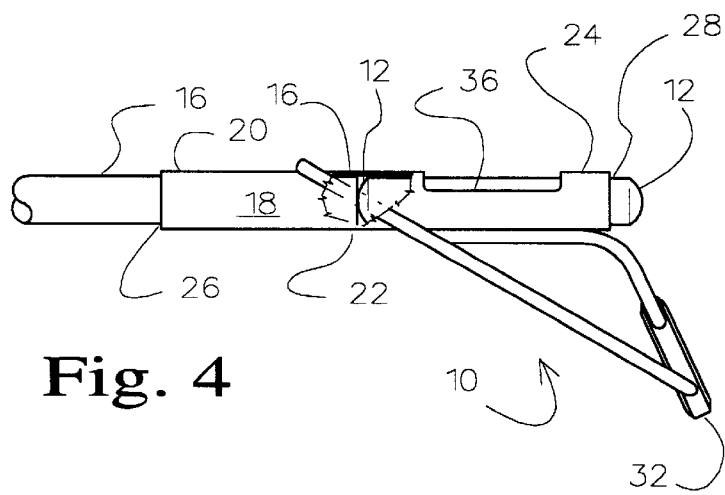
FIG. 4 is a side view of the embodiment of the invention illustrated in FIG. 2.
Figure 5:
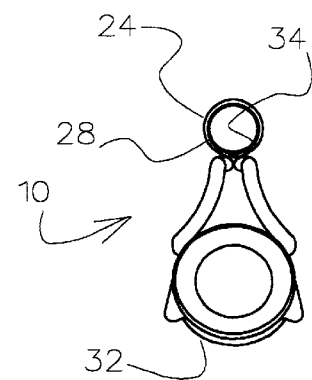
FIG. 5 is an end view of the embodiment of the invention illustrated in FIG. 4.

Turning now to FIGS. 4 through 7, it has been illustrated that in the highly preferred embodiment shown on FIGS. 4 and 5 the aperture 28 on the second end 24 of the hollow body 18 is adapted for receiving the cylindrical chemical illumination device 12 and is substantially parallel, and in-line with, the aperture 26 on the first end 20, which has been adapted for receiving the tip 16 of a fishing rod. There are several important advantages to this in-line arrangement of the aperture 28 adapted for receiving the chemical illumination device 12 and the aperture 26 adapted for receiving the tip 14 of a fishing rod. One of the advantages is that by having the aperture 28 directly in-line with the aperture 26 on the first end 20 one provides a convenient compartment for accepting the chemical illumination device 12 without disturbing the silhouette of the fishing rod. It is important to provide a low profile, smooth silhouette in order to prevent tangling or fouling of the fishing line with the attachment for the illumination device. Also, with regards to providing a manufacturing advantage, it is easier to manufacture a mold for a component that includes a body that is substantially symmetrical, with all components being in-line with one another.

It is contemplated that the attachment device 10 taught herein may be manufactured from a metal, such as steel or brass. In addition to strength and economy, a metal structure provides very desirable features in that the inner surface 34 of the aperture 28 in the second end 24 of the hollow body 18 of the attachment device 10 can be manufactured with a reflective surface in order to enhance the light projection abilities of the attachment device 10. However, it is also contemplated that the attachment device 10 could be made from a transparent plastic material, so that the structure does not block the illumination given off by the illumination device 12. Accordingly, if the attachment device is made from a transparent plastic material one may also selectively deposit a film of reflective material to the inner surface 34 of the aperture 28 in order to enhance the direction and reflection of the light produced by the illumination device.

Figure 6:
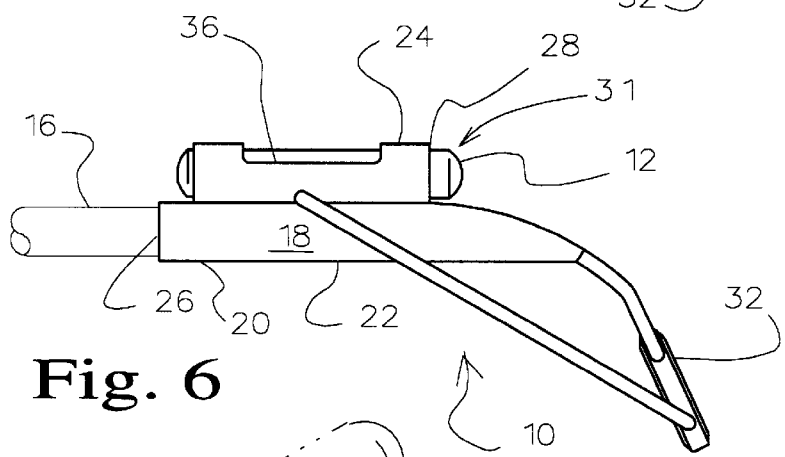
FIG. 6 is a side view of the embodiment of the invention illustrated in FIG. 3.
Figure 7:
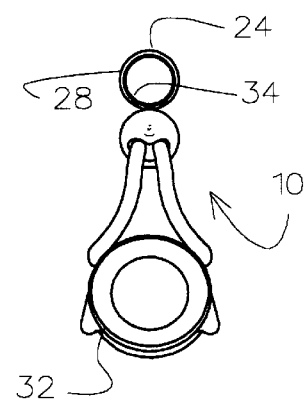
FIG. 7 is an end view of the embodiment of the invention illustrated in FIG. 6.

As shown in FIGS. 4 and 6, the second end 28 will preferably include a side aperture 36. The side aperture 36 is included primarily for the purpose of allowing light form the chemical illumination device 12 to escape, so that the tip 14 of the fishing rod may be easily observed at night.

Referring now to FIG. 6, it is shown that it is contemplated that the attachment device 10 may be manufactured with the clamping means 31 mounted in a piggy-back, or parallel, fashion near the first end 20 of the hollow body 18. One of the advantages of offering a parallel mounting of the clamping means 31 is that this arrangement improves the ease of removal of spent chemical illumination devices 12 from the clamping means 31. This is due to the fact that when the clamping means 31 is installed in a parallel fashion, the aperture 28 adapted for receiving the illumination device 12 is accessible from both ends and. Therefore, to remove a spent illumination device 12 one may simply push the illumination device from one end of the aperture 28. However, as discussed above, the parallel arrangement shown on FIGS. 6 and 7 suffers from the disadvantage of presenting a protrusion which may cause the fishing line to foul or tangle.

While the currently devised best method for making the attachment device 10 includes clamping means 31 which is defined by the aperture 28 in a hollow body 18 and adapted for receiving and holding the chemical illumination device 12 in an interference fit. As shown on FIGS. 11 through 14, it is contemplated that the clamping means may be defined by at least one pair of resilient arms 40 extending from the hollow body 18. The pair of resilient arms 40 are of a generally bowed shape, which has been adapted for receiving the chemical illumination device 12 in a manner that allows the pair of resilient arms 40 to hold the illumination device 12 while engaging in fishing activities, including casting, observing the tip, and fighting a fish. It should be emphasized that the attachment of a chemical illumination device 12 on the tip of a fishing rod by means of an attachment device 10 made according to the principles taught herein allows the fisherman to experience enhanced sensitivity due to the light weight of the entire assembly. Also, it is important to point out that the structure of the attachment device 10 as taught herein is very light and very efficient in so far as being able to hold the chemical illumination device 12 while adding a minimal amount of weight to the tip of the rod. Still further, the disclosed structure can be very easily manufactured.

In preferred embodiments shown on FIGS. 1 through 7 and 11 through 14 the attachment device 10 includes the line guide 32 situated in a position opposite the aperture 28 in the second end 24 of the hollow body 18 or opposite the pair of resilient arms 40, which serve as resilient means for holding the chemical illumination device 12 on to the attachment device 10. In the embodiments shown in FIGS. 1 through 7 and 11 through 14 the aperture 28 adapted for receiving the cylindrical chemical illumination device 12 is substantially parallel to the aperture 26 adapted for receiving the tip 16 of the fishing rod 14. As discussed earlier, this arrangement for its ability to produce a low profile arrangement which has little effect on the performance of the fishing pole 14.

It will become apparent from the above discussion that another aspect of the invention is the discovery of a method for illuminating the tip of a fishing rod 14. The method includes the steps of providing a chemical illumination means, such as the chemical illumination device 12. Then providing an attachment means for accepting the tip 16 of the fishing pole 14 and having means for accepting a chemical illumination device 12. With these two first steps the user begins the process of modifying or providing a fishing pole which can be used at night without the suffering from the problems of weight, reliability, and manufacturability associated with the prior art.

After the inserting the tip 16 of the fishing pole 14 into the attachment means 10 one should then insert the chemical illumination device 12 into the means for accepting the means for accepting the chemical illumination device 12, which in a preferred embodiment is the aperture 28 in the second end 24 of the hollow body 18.

Thus, the disclosed attachment device 10 may be used as original equipment on a fishing pole, or sold as a device for allowing fishermen to modify their fishing poles to provide night fishing capabilities without detracting from the pole's characteristics when using the pole during the daytime. In other words, a fishing pole incorporating the attachment device 10 could be used in the daytime without suffering from the detriments of weight lack of sensitivity produced by devices which incorporate battery powered illumination. Also, since the attachment device 10 taught here is extremely reliable as compared to devices which include electrical circuitry. Thus a fisherman would not be deterred from using a fishing pole incorporating the attachment device 10 during the day for fear of imparting unnecessarily wear and tear on the circuitry which is unused during the daytime but is still exposed to flexing and detrimental effects of water and the atmosphere (oxidation) while in the field.

As discussed above, it is contemplated that the clamping means 31, in other words, the means for accepting the chemical illumination device 12, may advantageously be made from at least one pair of arched resilient arms 40. Referring now to FIGS. 8 through 10 and 15 through 17, it is contemplated that a removeable attachment device 10A could be made for attaching the chemical illumination device 12 the tip area of a fishing rod 14. The embodiment shown in FIGS. 8 through 10 includes a pair of resilient arms 40 for attaching a chemical illumination device 12. However in the embodiment shown on FIGS. 8 through 10 also includes a second pair of resilient arms 42 mounted opposite to the first pair of resilient arms 40. The second pair of resilient arms 42 are adapted for attachment of the device 10A to a fishing rod 14, near the tip 16 of the rod 14.

Figure 8:
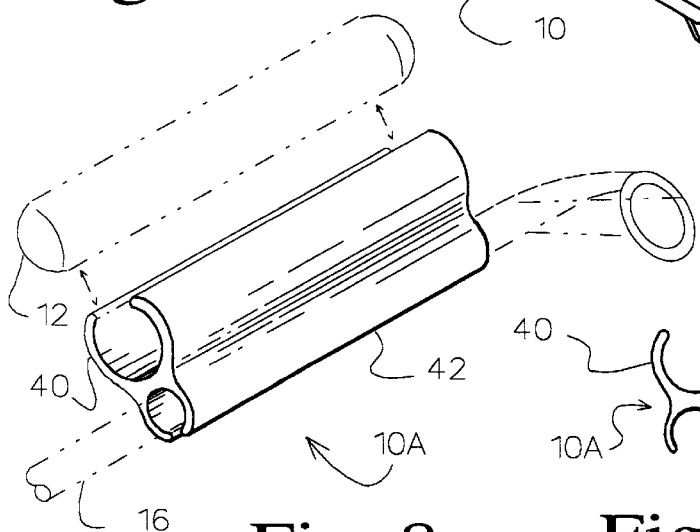
FIG. 8 is a perspective view of an alternative embodiment containing of a device taking advantages of principles taught herein.
Figure 9:
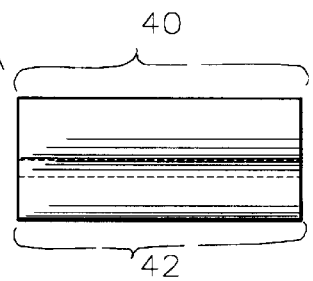
FIG. 9 is an end view of the embodiment shown on FIG. 8.
Figure 10:
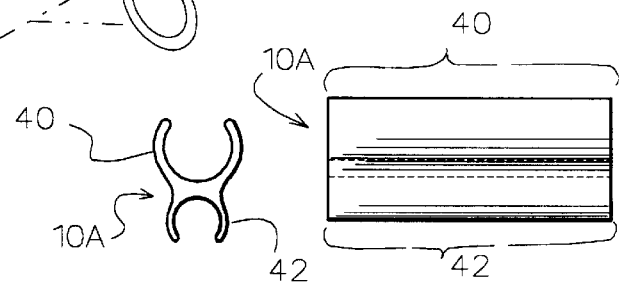
FIG. 10 is a side view of the embodiment shown on FIG. 9.

The embodiment illustrated in FIGS. 8 through 10 has the advantage of being very easily manufactured. As has been clearly illustrated in FIG. 9, the embodiment illustrated in FIGS. 8 through 10 has a constant cross section, which allows manufacture of the device as a plastic extrusion. By fabricating the removeable attachment device 10A from a single extruded section one can achieve a lightweight attachment device which can reliably hold a chemical illumination device 12 on to the tip area of the fishing pole 14, without having to incorporate or support batteries or other elements required of electrically activated illumination devices.

Referring now to FIGS. 15 through 17, it is shown that an alternative embodiment of the removeable attachment means 10A may be fabricated from resilient wire or rod shaped resilient material. Thus the embodiment shown on FIGS. 15 through 17 also includes a second pair of resilient arms 42 mounted opposite to the first pair of resilient arms 40. However, in this embodiment the first pair of resilient arms 40 and the second pair of resilient arms 42 are coupled to another set of a first pair of resilient arms 40 and a second pair of resilient arms 42 by means of spacers 44. One of the key advantages of this embodiment, as well as the embodiment illustrated in FIGS. 8 through 10 are that one may temporarily install the removeable attachment means 10A to an existing pole without having to modify permanently the line guides or the fishing pole 14. Of course, this important advantage is in addition to the other advantages of light weight, ease of manufacture, and reliability discussed above.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

What is claimed is:

1. A device for illuminating a fishing rod tip by attaching a chemical illumination device having a generally cylindrical body to the fishing rod tip, the device comprising:

a body having a first end, a mid portion, and a second end, the first end having an aperture adapted for receiving the tip of the fishing rod, the second end having a line guide;

at least one pair of resilient arms located near the line guide and extending from the body and away from the line guide in a direction substantially perpendicular to the body, the at least one pair of resilient arms adapted for receiving the chemical illumination device in a coaxial manner relative to the tip of the fishing rod.

2. The device according to claim 1, wherein said first end further comprises at least one aperture adapted for accepting the body of the chemical illumination device, so that the at least one aperture adapted for accepting the body of the chemical illumination device cooperates with said at least one pair of resilient arms to retain the chemical illumination device in a coaxial manner relative to the tip of the fishing rod.

3. A device for illuminating a fishing rod tip by attaching a chemical illumination device having a generally cylindrical body to the tip, the device comprising:

a hollow body having a first end, a mid portion, and a second end, the first end having an aperture adapted for receiving the tip of the fishing rod and an aperture for receiving the cylindrical body of the chemical illumination device, the second end having a line guide and resilient means for receiving the chemical illumination device and for engaging the cylindrical body of the chemical illumination device, the resilient means for receiving and for engaging the chemical illumination device having a pair of opposing arms which are near the line guide and extend both away from the line guide and generally perpendicular to the hollow body, so that the device for illuminating a fishing rod tip serves as a line guide while holding the chemical illumination device.

4. The device according to claim 3, wherein said pair of opposing resilient arms define a space therebetween, the space being generally in line with the aperture for receiving the rod tip and allowing placement of the body of the chemical illumination device in a generally coaxial manner relative to the rod tip.

5. A method for illuminating a tip of a fishing rod, the method comprising:

provjding a chemical illumination device having a generally cylindrical body;

providing an attachment means for accepting the tip of a fishing rod and for accepting the cylindrical body of the chemical illumination device in a coaxial manner relative to the tip of the fishing rod, the attachment means having a hollow body having a first end, a mid portion, and a second end, the first end having an aperture adapted for receiving the tip of the fishing rod, and an aperture for receiving the body of the chemical illumination device the second end having a line guide and at least one pair of resilient arms located near the line guide and extending from the body and away from the line guide in a direction substantially perpendicular to the body, the at least one pair of resilient arms being adapted for accepting the chemical illumination device;

inserting the tip of the fishing rod into the means for accepting the tip of a fishing rod; and inserting the chemical illumination device into the aperture for receiving the body of the chemical illumination device and then inserting the body of the chemical illumination device into the at least one pair of resilient arms.

6. The method according to claim 5, and further comprising providing a side aperture near the second end of said hollow body.

* * * * *